US008679249B2

(12) United States Patent
Yoon et al.

(10) Patent No.: US 8,679,249 B2
(45) Date of Patent: Mar. 25, 2014

(54) PROCESS FOR PREPARATION OF COMPOUND CONTAINING 6A GROUP ELEMENT USING REDUCTANT

(75) Inventors: Seokhee Yoon, Daejeon (KR); Seokhyun Yoon, Daejeon (KR); Taehun Yoon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 723 days.

(21) Appl. No.: 12/738,005

(22) PCT Filed: Oct. 14, 2008

(86) PCT No.: PCT/KR2008/006046
§ 371 (c)(1),
(2), (4) Date: Aug. 24, 2010

(87) PCT Pub. No.: WO2009/051387
PCT Pub. Date: Apr. 23, 2009

(65) Prior Publication Data
US 2010/0307556 A1    Dec. 9, 2010

(30) Foreign Application Priority Data
Oct. 18, 2007 (KR) .................. 10-2007-0104874

(51) Int. Cl.
*C01B 19/04* (2006.01)
*C01B 19/00* (2006.01)
*C30B 1/00* (2006.01)

(52) U.S. Cl.
USPC ............. 117/68; 423/508; 423/509; 423/659; 427/215

(58) Field of Classification Search
USPC ............. 423/508, 509, 659; 117/68; 427/215
See application file for complete search history.

(56) References Cited

U.S. PATENT DOCUMENTS

| 6,127,202 | A  | * | 10/2000 | Kapur et al. ................ 438/47 |
| 6,268,014 | B1 | * | 7/2001  | Eberspacher et al. ......... 427/74 |
| 6,379,585 | B1 | * | 4/2002  | Vecht et al. ............. 252/301.35 |
| 7,229,497 | B2 | * | 6/2007  | Stott et al. .................... 117/68 |
| 7,833,506 | B2 | * | 11/2010 | Rauscher et al. ............ 423/509 |
| 7,910,164 | B2 | * | 3/2011  | Kim et al. ..................... 427/212 |
| 2006/0062902 | A1 | | 3/2006 | Sager et al. |
| 2007/0054435 | A1 | | 3/2007 | Yoon |

(Continued)

FOREIGN PATENT DOCUMENTS

| JP | 08-092788 | 4/1996 |
| JP | 09-036408 | 2/1997 |
| JP | 10-045404 | 2/1998 |
| WO | WO 97/23004 | 6/1997 |

OTHER PUBLICATIONS

C.J. Huang et al, "Formation of CuInSe2 thin films on flexible substrates by electrodeposition (ED) technique", Solar Energy Materials and Solar Cells (2004, 82 (4), 553-565.*

(Continued)

*Primary Examiner* — Wayne Langel
(74) *Attorney, Agent, or Firm* — McKenna Long & Aldridge

(57) ABSTRACT

Provided is a process for preparation of a compound containing a group 6A element which includes reaction of at least one compound selected from a group consisting of group IB element containing compounds and group 3A element containing compounds with a group 6A element containing compound carried out using a reductant in a desirable solvent to produce a compound containing group 1B-6A elements, a compound containing group 3A-6A elements and/or a compound containing group 1B-3A-6A elements.

13 Claims, 2 Drawing Sheets

(56) References Cited

U.S. PATENT DOCUMENTS

| | | | | |
|---|---|---|---|---|
| 2007/0264504 A1* | 11/2007 | Mitzi et al. | | 428/411.1 |
| 2008/0160306 A1* | 7/2008 | Mushtaq et al. | | 428/402 |
| 2008/0299033 A1* | 12/2008 | Caldwell et al. | | 423/508 |
| 2009/0169892 A1* | 7/2009 | Bazzi et al. | | 428/404 |
| 2009/0236594 A1* | 9/2009 | Mitzi et al. | | 257/42 |
| 2009/0242033 A1* | 10/2009 | Yoon et al. | | 136/264 |
| 2010/0003187 A1* | 1/2010 | Guo et al. | | 423/509 |
| 2011/0056564 A1* | 3/2011 | Korgel et al. | | 136/265 |

OTHER PUBLICATIONS

Jin et al. "Hydrothermal synthesis and characterization of $CuIn_{2.0}Se_{3.5}$ nanocrystallites", Materials Letters, vol. 57, pp. 4267-4270, 2003.

* cited by examiner

PROCESS FOR PREPARATION OF COMPOUND CONTAINING 6A GROUP ELEMENT USING REDUCTANT

This application is a 35 U.S.C. §371 National Stage entry of International Application No. PCT/KR2008/006046 filed on Oct. 14, 2008, and claims priority to Korean Application No. 10-2007-0104874 filed on Oct. 18, 2007, which are all hereby incorporated by reference in their entireties.

FIELD OF THE INVENTION

The present invention relates to a process for preparation of group 6A element containing compounds and, more particularly, a process for preparation of a compound containing a group 6A element which includes a reaction of at least one compound selected from a group consisting of group 1B element containing compounds and group 3A element containing compounds with a group 6A element containing compound carried out using a reducing agent (reductant) in a desirable solvent to produce a compound containing group 1B-6A elements, a compound containing group 3A-6A elements and/or a compound containing group 1B-3A-6A elements.

BACKGROUND OF THE INVENTION

Due to increasing environmental (pollution) problems and accelerated energy depletion, there has recently been growing interest in a solar cell with high energy efficiency, which is obtainable from abundant natural resources and has no environmental pollution problems, as an alternative energy resource.

Such a solar cell generally has an absorption layer comprising a Cu—In(Ga)—Se film (often referred to as "CI(G)S based absorption layer") as a coating layer containing a 1B-3A-6A group based compound so as to exhibit a high energy conversion rate and no deterioration caused by light irradiation, thus being considerably advantageous in the art.

The CI(G)S based absorption layer is typically fabricated by two kinds of conventional method, in particular, vacuum deposition and a method for applying a precursor under non-vacuum conditions followed by thermal treatment at high temperatures. The vacuum deposition may produce a high efficiency adsorption layer, however, may have problems such as decreased uniformity in manufacture of absorption layers having considerably large areas, requiring costly equipment, etc. On the contrary, the method for applying a precursor and thermally treating the same may provide an absorption layer with a large-scale uniform area, however, may entail reduced efficiency of the absorption layer.

Among methods for fabrication of an absorption layer using a precursor, for example, a method for applying a mixture paste of metal oxides to a surface of a substrate and post-processing the coated substrate to form an absorption layer has been disclosed. Although this method has a merit of preparing a uniform absorption layer at a low cost, the metal oxides used as a precursor are chemically and thermally stable so that large crystals may not be present in the final absorption layer, thus decreasing efficiency of a solar cell.

In order to solve the above problems in regard to conventional techniques, Korean Patent Laid-Open Publication No. 2005-82723 issued to the present applicant proposed a process for fabrication of a CIGS based absorption layer wherein copper selenide compound particles are mixed with indium selenide compound particles to prepare a mixture paste, the mixture paste is applied to a substrate, and the obtained coating layer on the substrate is rapidly heated to form the CIG based absorption layer. This process may increase a crystal size of the compound particle so as to allow fabrication of a high efficiency solar cell and may omit hydrogen reduction and selenide generation processes, thus simplifying the process of fabricating a CIGS based absorption layer for a solar cell.

In this regard, the present invention suggests a novel method for preparation of a compound containing group 6A element such as indium selenide, copper selenide, a composite thereof, and the like.

A conventional method for preparation of a $CuSe_2$ compound may be exemplified by a mechanical alloying process which includes mixing of Cu powder and Se powder in a desired relative molar ratio and treating the mixture with a high energy ball mill (see, T. Ohtani, M. Motoki, K. Koh, K. Ohshima, Materials Research Bulletin, 30, (1995), 1495). However, this process has problems including, for example, neither control of specific reaction conditions nor detailed control of particle size and/or distribution of a product.

Another method for preparation of a $CuSe_2$ compound has been disclosed, including: heating a $CuCl_2$ solution in tri-n-octylphosphine (TOP) to 100° C.; introducing tri-n-octylphosphine oxide (TOPO) to the solution; adding tri-n-octylphosphine selenide (TOPSe) to the reaction mixture at 250° C. and reacting the same; and precipitating the reaction product in methanol to separate a copper selenide moiety, thus producing a final $CuSe_2$ compound (see, H. Winkler, A. Brikner, V. Hagen, I. Wolf, R. Schmchel, H. V. Seggern, and R. A. Fischer, Advanced materials, 11 (17) 1444, 1999). However, the above method has a problem of using high price TOPO and TOPSe as a reaction raw material and a solvent, respectively.

Among conventional methods for preparation of an indium selenide compound, a chemical bath deposition (CBD) and a chemical method using tri-methylindium (TMI) as a reactant in a TOP solvent have been disclosed. The former has limitations such as difficulty in particle size and low reaction rate, while the latter entails problems of using high price TOP and unstable TMI as a reaction raw material and a solvent, respectively.

Meanwhile, some technologies using indium sulfate and/or selenious acid as a part of raw materials in the process of fabricating a CIGS based absorption layer have been disclosed. For instance, Japanese Patent Laid-Open Application No. 1997-036408 described a process for fabrication of an InSe compound layer used for a CIG based absorption layer involving electroplating in the presence of indium ions, selenious acid ions, sulfuric acid and sodium citrate. However, an electroplating based process exhibits reduced uniformity of the InSe compound layer formed on a substrate and requires high production costs compared to the previous method proposed by the present applicant, thus deteriorating physical properties of a final absorption layer. Therefore, the above process has not been applied in current mass-production thereof.

Accordingly, in consideration of various circumstances described above, there is still a strong demand for a process for preparation of group 6A element containing compounds such as metal selenides in fabrication of CI(G)S based thin films.

SUMMARY OF THE INVENTION

Therefore, the present invention has been made to solve the above problems and other technical problems that have yet to be resolved.

The present inventors have undertaken extensive research and studies and found that a compound containing a group 6A element with a uniform size and excellent dispersion and coating properties may be prepared by reacting a compound containing a group 1B element and/or a compound containing a group 3A element with a compound containing a group 6A element using a reductant in a desirable solvent, so that reaction conditions such as size and/or constitutional composition of the compound may be readily controlled and the reaction may be conducted at relatively low temperatures, thereby considerably reducing production costs. As a result, the present invention has been accomplished.

On the basis of this finding, it is an object of the present invention to provide a process for preparation of a compound containing a group 6A element which includes reaction of at least one compound selected from a group consisting of group 1B element containing compounds and group 3A element containing compounds with a group 6A element containing compound carried out using a reductant in a desirable solvent to produce a compound containing group 1B-6A elements, a compound containing group 3A-6A elements and/or a compound containing group 1B-3A-6A elements.

The disclosed process includes use of a reductant to carry out the reaction in a desirable solvent so as to attain various advantages including, for example: production of a compound with excellent dispersion and coating properties as well as a uniform size, a reaction at low temperatures to reduce production costs, easy control of reaction conditions such as size and/or constitutional composition of a compound, and so forth. In addition, this process is not limited to use of a reductive solvent in the reaction but may adopt a non-reductive solvent, thus having a more extended range of reaction conditions.

The compounds containing group 1B elements and the compounds containing group 3A elements may take the form of salts so as to be ionized in a solvent and to react with a compound containing a group 6A element.

The group 1B elements may include copper (Cu), and the group 1B element containing compounds may include compounds having only group 1B elements such as copper salt compounds and/or compound particles simultaneously containing both the group 1B elements and the group 6A elements such as Cu—Se, Ag—Se, Au—Se, etc.

The group 3A elements may include indium (In) or gallium (Ga), and the group 3A element containing compounds may include compounds having only group 3A elements such as indium salt compounds and/or compound particles simultaneously containing both the group 3A elements and the group 6A elements such as In—Se, Ga—Se, Al—Se, Ti—Se, In—Ga—Se, In—Al—Se, In—Ti—Se, etc.

The group 6A elements may include selenium (Se) or sulfur (S), and the group 6A element containing compounds may include, for example, selenic acid ($H_2SeO_4$), sodium selenite ($Na_2SeO_3$), sodium selenate ($Na_2SeO_4$), selenium dioxide, selenious acid ($H_2SeO_3$), and the like.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Figure 1:
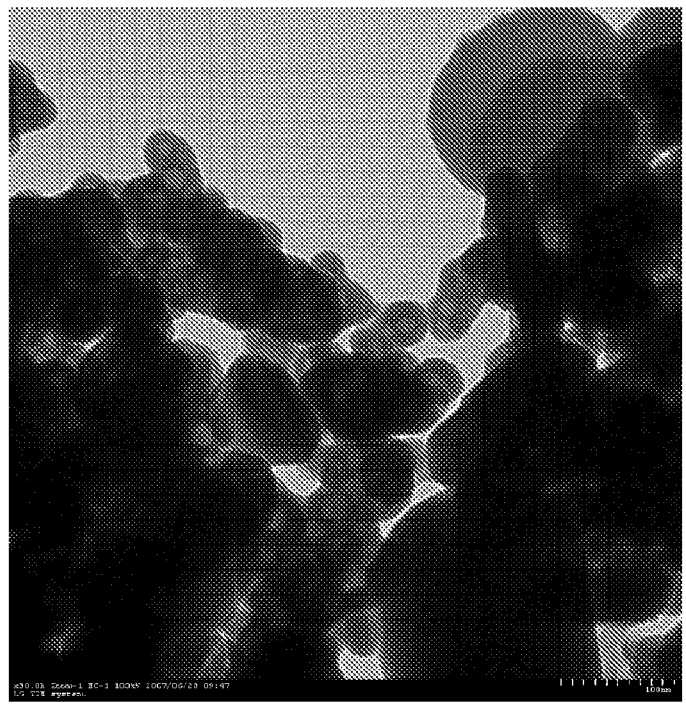
FIG. 1 is a transmission electron microscope (TEM) image illustrating a reaction composite prepared according to Example 5 of the present invention.

As for a preferred combination of the compounds, the compound containing a group 1B element may be a copper salt compound while the compound containing a group 6A element may be $H_2SeO_4$, $Na_2SeO_3$, $Na_2SeO_4$, selenium dioxide or $H_2SeO_3$. Accordingly, reacting these compounds may produce a compound containing group 1B-6A elements, that is, copper selenide ($Cu_x$—$Se_y$). Such copper salt compounds may include, but are not limited to, copper nitrate ($Cu(NO_3)_2$), copper sulfate ($CuSO_4$), copper chloride (CuCl or $CuCl_2$), copper bromide (CuBr or $CuBr_2$), copper iodide (CuI or $CuI_2$), copper hydroxide ($Cu(OH)_2$), and so forth. Optionally, these compounds may be used in combination with two or more thereof and copper nitrate ($Cu(NO_3)_2$) is particularly preferred.

As for another preferred combination of the compounds, the compound containing a group 3A element may be an indium salt compound while the compound containing a group 6A element may be $H_2SeO_4$, $Na_2SeO_3$, $Na_2SeO_4$, selenium dioxide or $H_2SeO_3$. Accordingly, reacting these compounds together may produce a compound containing group 3A-6A elements, and preferably, indium selenide.

Such indium salt compounds may include, but are not limited to, indium nitrate ($In(NO_3)_3$), indium sulfate ($In_2(SO_4)_3$), indium chloride ($InCl_3$), indium bromide (InBr, $InBr_2$ or $InBr_3$), indium hydroxide ($In(OH)_3$), and so forth. Optionally, these compounds may be used in combination with two or more thereof and indium nitrate ($In(NO_3)_3$) is particularly preferred.

According to the process of the present invention, reactants are generally added in stoichiometric amounts but these amounts may be varied in consideration of relative reactivity of each reactant.

The compound containing group 1B-6A elements, the compound containing group 3A-6A elements and/or the compound containing group 1B-3A-6A elements, each of which are prepared by the disclosed process, may take the form of particles.

More particularly, the particle containing group 1B-3A-6A elements may comprise a reaction composite formed using at least one selected from the particle containing group 1B-6A elements and the particle containing group 3A-6A elements as a seed and bringing the remainder (except the seed) into contact with one or more parts on a surface of the seed reactant.

That is, any one of the particle containing group 1B-6A elements as one of group 1B element containing compounds and the particle containing group 3A-6A elements as one of group 3A element containing compounds may be used as the seed.

In an exemplary embodiment, a copper selenide particle which is the particle containing group 1B-6A elements may be used as a seed reactant. Indium nitrate as the particle containing group 3A element and $H_2SeO_4$, $Na_2SeO_3$, $Na_2SeO_4$, selenium dioxide or $H_2SeO_3$, each being the particle containing group 6A element, are placed together in an organic solvent to conduct a reaction therebetween so that a reaction composite having the copper selenide particle coated with indium selenide may be produced. In other words, the particle containing group 1B-6A elements and/or the particle containing group 3A-6A elements is present in the form of only an aggregated particle through physical bonding, so as to prepare the compound containing group 1B-3A-6A elements.

In another exemplary embodiment, an indium selenide particle which is the particle containing group 3A-6A elements may be used as a seed reactant. Copper nitrate as the particle containing group 3A element and $H_2SeO_4$, $Na_2SeO_3$, $Na_2SeO_4$, selenium dioxide or $H_2SeO_3$, each being the particle containing group 6A element, are placed together as a reaction precursor in an organic solvent to conduct a reaction therebetween so that a reaction composite having the indium selenide particle coated with copper selenide may be produced.

Herein, the remainder (except the seed reactant) is in contact with a surface of the seed reactant through physical bonding so as to produce the reaction composite. Accordingly, as for a preferred embodiment of the reaction composite, the composite may have a core-shell structure wherein the seed reactant is coated with the remainder, or may have a dendrite structure wherein the remainder is partially grown on a surface of the seed reactant. However, the reaction composite of the present invention is not particularly limited thereto.

Such a reaction composite may solve conventional problems such as dispersion and mixing between reactants occurred, for example, when a CI(G)S based thin film is fabricated using the particle containing group 1B-6A elements and the particle containing group 3A-6A elements as reaction precursors. That is, the prepared reaction composite may be used as a reaction precursor to fabricate the CI(G)S based thin film while favorably enhancing reaction uniformity.

As described above, the process of the present invention may include a reaction carried out using a reductant in a desirable solvent.

Such reductant is not particularly restricted so long as it drives a reductive reaction required to react a group 1B element and/or group 3A element containing compounds with a group 6A element containing compound, and then, to prepare a compound which includes both the elements (that is, group 1B element and/or group 3A element as well as group 6A element). Conventionally known reductants including organic or inorganic reductants may be used. For example, the reductant may include at least one selected from a group consisting of hydrazine ($N_2H_4$), $NaBH_4$, $NaBH(OAc)_3$, $LiAlH_4$, diisobutylaluminum hydride (DIBALH), phenyl hydrazine, ascorbic acid, cysteine, fructose, ribose, galactose, tocopherol and triethanolamine or mixtures of two or more thereof, however, the present invention is not particularly restricted thereto.

An amount of the reductant to be added is not particularly limited since an equivalent weight thereof depends on ratios of atoms constituting the final product and may range from 1 to 100 equivalent weights, and preferably, 1 to 50 equivalent weights of a 3A group compound or 1B group compound used in the process.

The solvent is not particularly restricted so long as it does not react with the reductant, and may include not only a non-reductive solvent but also a reductive solvent. For example, the solvent may include water, or alcohol, ether, ketone, amine, amide, sulfoxide or pyrrolidone based solvents, although the present invention is not particularly limited thereto. Optionally, the solvent may include mixtures of two or more thereof. In more preferred embodiments, the solvent may be at least one or two selected from a group consisting of water, ethanol, isopropanol, polyethylene glycol, ethylene glycol, diethylene glycol, 1,4-butandiol, propyleneglycol, polypropyleneglycol, N-methylpyrrolidinone (NMP), dimethylsulfoxide (DMSO), dimethylformamide (DMF) and dimethylacetamide (DMAc).

As for an important aspect of the present invention, the reaction is carried out in a solvent containing the reductant which in turn may be performed at relatively low temperature. The relatively low temperature means a temperature lower than a temperature required to prepare a compound containing a group 6A element by a reductive solvent. However, the process of the present invention does not exclude a high temperature reaction.

A heating process may be conducted at room temperature to 250° C. for 1 to 48 hours after adding the reductant to a reaction precursor, more preferably, at room temperature to 200° C. for not more than 10 hours.

As a result, production costs are greatly reduced and limitations in processing due to the heating process are eliminated, so that processing efficiency may be enhanced. In addition, since the reaction can be carried out even at room temperature, reaction conditions may be easily controlled.

The disclosed process of the present invention may further include additional processes without impairing functional effects of the present invention, which are intended to be included within the spirit and scope of the invention.

The present invention also provides a particle containing a group 6A element with a particle size of 10 nm to 20 µm, which includes a compound containing group 3A-6A elements, a compound containing group 1B-6A elements and/or a compound containing group 1B-3A-6A elements.

The compound particle containing group 1B-6A elements may have a particle size of 5 nm to 2 µm, while the compound particle containing group 3A-6A elements may have a particle size of 5 nm to 1 µm. Additionally, the compound particle containing group 1B-3A-6A elements may have a particle size of 5 nm to 10 µm, more preferably, 5 nm to 1 µm.

As such, because of the small particle size, when these compound particles are mixed together and reacted under desired conditions, a diffusion length of each atom to be reacted in the particles may be considerably decreased. Therefore, a reaction yield may be enhanced and, if a CI(G)S based absorption layer is fabricated, a crystal with increased size may be obtained. Consequently, a solar cell with improved energy efficiency may be manufactured.

The present invention provides a solar cell having an absorption layer consisting of a $Cu(In, Ga)Se_2$ ('CI(G)S') based thin film which is fabricated using a precursor compound prepared by the above process.

As described above, the compound particle containing a group 6A element prepared by the disclosed process of the present invention has merits of a uniform particle size, and excellent dispersion and coating properties. Accordingly, when such a compound is dispersed in a dispersant and rapidly heated to fabricate a CI(G)S based absorption layer, uniform crystal growth may be attained throughout the CI(G)S based absorption layer by a uniform reaction, so that a solar cell having this absorption layer may exhibit superior energy efficiency.

Furthermore, the present invention provides a solar cell module comprising a plurality of solar cells. The process for manufacturing a solar cell module is well known in the art and, therefore, further detailed description thereof will be omitted hereinafter for brevity and to prevent the present invention from being unclear.

EXAMPLES

Now, the present invention will be described in more detail in the following description with reference to exemplary embodiments and examples of the present invention, which are given for illustrative purposes only and should not be construed as limiting the spirit and scope of the invention.

Example 1

10 mmol of aqueous indium nitrate solution and 10 mmol of selenious acid were dissolved in ethylene glycol, mixed together, and heated to 150° C. to proceed a reaction. A solution of 10 mmol of copper (II) nitrate and 20 mmol of selenious acid was added to the reacted mixture, followed by adding 100 mmol of hydrazine as a reductant at room temperature. After reacting for 1 hour, the reaction product was subjected to centrifugation and purification to prepare a reaction composite in a core-shell form having a size of 50 to 100 nm wherein an indium selenide particle was coated with copper selenide.

Example 2

10 mmol of aqueous indium nitrate solution and 10 mmol of selenious acid were dissolved in 1,4-butanediol, mixed together, and heated to 140° C. to proceed a reaction. A solution of 10 mmol of copper (II) sulfide and 30 mmol of selenious acid was added to the reacted mixture, followed by adding 100 mmol of hydrazine as a reductant at room temperature. After reacting for 3 hours, the reaction product was subjected to centrifugation and purification to prepare a reaction composite in a core-shell form having a size of 20 to 100 nm wherein an indium selenide particle was coated with copper selenide.

Example 3

10 mmol of aqueous indium nitrate solution and 15 mmol of selenious acid were dissolved in water, mixed together, and heated to 60° C. As a reductant, 90 mmol of ascorbic acid was added to the mixture and agitated for 1 hour. A solution of 10 mmol of copper (II) chloride and 20 mmol of selenious acid was added to the reacted mixture, followed by adding 100 mmol of hydrazine as another reductant. After reacting for 1 hour, the reaction product was subjected to centrifugation and purification to prepare a reaction composite in a core-shell form having a size of 20 to 80 nm wherein an indium selenide particle was coated with copper selenide.

Example 4

10 mmol of indium (III) nitrate ($In(NO_3)_3$) and 10 mmol of selenious acid were dissolved in ethylene glycol, mixed together, and heated to 160° C. to proceed a reaction. After centrifuging and purifying the reaction mixture, the obtained product was again dispersed in diethylene glycol. 10 mmol of copper chloride and 25 mmol of ascorbic acid were added to the dispersion, followed by reacting the mixture at 150° C. for 3 hours. A mixture including 50 mmol of ascorbic acid and 50 mmol of hydrazine as a reductant was added to the reaction product, followed by reacting the mixture at 180° C. for 3 hours. The obtained reaction product was subjected to centrifugation and purification to prepare a reaction composite in a core-shell form having a size of 200 to 300 nm wherein an indium selenide particle was coated with copper selenide.

Example 5

10 mmol of aqueous indium hydrochloric acid solution and 10 mmol of selenious acid were dissolved in diethylene glycol, mixed together, and heated to 150° C. to proceed a reaction. A solution of 10 mmol of copper chloride and 10 mmol of selenious acid was added to the reacted mixture, followed by adding 100 mmol of a solution of ascorbic acid and cysteine in a molar ratio of 1:1 as a reductant at 100° C. After reacting for 1 hour, the temperature was elevated to 180° C. and the reaction product was additionally reacted at the same temperature for 6 hours. The obtained reaction product was subjected to centrifugation and purification to prepare a reaction composite in a core-shell form having a size of 20 to 50 nm wherein an indium selenide particle was coated with copper selenide.

Example 6

10 mmol of aqueous indium chloride and 10 mmol of selenious acid were mixed together and ethylene glycol was added thereto. After agitating the mixture at 150° C. for 2 hours, 10 mmol of copper nitrate, 10 mmol of selenious acid and 10 mmol of polyvinyl pyrrolidone (PVP) as a capping agent were added to the above mixture, and then, heated to 100° C. 100 mmol of a solution of ascorbic acid, tocopherol, cysteine and hydrazine in a molar ratio of 1:1:1:1 was added to the heated reaction product. After agitating overnight, the obtained reaction product was subjected to centrifugation and purification to prepare a reaction composite in a core-shell form having a size of 80 to 100 nm wherein an indium selenide particle was coated with copper selenide.

Example 7

10 mmol of aqueous indium nitrate solution and 10 mmol of selenious acid were dissolved in butanediol, mixed together, and heated to 150° C. to proceed a reaction. A solution of 10 mmol of copper nitride and 20 mmol of selenious acid was added to the reacted mixture, followed by adding 100 mmol of lactose as a reductant at room temperature. After reacting for 1 hour, the temperature was elevated to 180° C. and the reaction product was additionally reacted at the same temperature for 6 hours. The obtained reaction product was subjected to centrifugation and purification to prepare a reaction composite in a core-shell form having a size of 500 nm to 1 μm wherein an indium selenide particle was coated with copper selenide.

Example 8

10 mmol of aqueous indium chloride and 10 mmol of selenious acid were dissolved in ethylene glycol, mixed together and heated to 150° C. to proceed a reaction. A solution of 10 mmol of copper chloride and 20 mmol of selenious acid was added to the reaction mixture, followed by adding 100 mmol of fructose solution as a reductant at room temperature. After reacting for 1 hour and further reacting at 150° C. overnight, the obtained reaction product was subjected to centrifugation and purification to prepare a reaction composite in a core-shell form having a size of 30 to 60 nm wherein an indium selenide particle was coated with copper selenide.

Example 9

10 mmol of aqueous indium nitrate solution and 10 mmol of selenious acid were dissolved in butanediol, mixed together, and heated to 150° C. to proceed a reaction. A solution of 10 mmol of copper chloride and 20 mmol of selenious acid was added to the reacted mixture, followed by adding 100 mmol of tocopherol as a reductant at room temperature. After reacting for 1 hour, the temperature was elevated to 150° C. and the reaction product was additionally reacted at the same temperature for 6 hours. The obtained reaction product was subjected to centrifugation and purification to prepare a reaction composite in a core-shell form having a size of 300 to 500 nm wherein an indium selenide particle was coated with copper selenide.

Example 10

10 mmol of aqueous indium nitrate solution and 10 mmol of selenious acid were dissolved in butanediol, mixed together, and heated to 150° C. to proceed a reaction. A solution of 10 mmol of copper chloride and 20 mmol of selenious acid was added to the reacted mixture, followed by adding 25 mmol of $NaBH_4$ solution as a reductant at room temperature. After reacting for 1 hour, the temperature was elevated to 150° C. and the reaction product was additionally reacted at the same temperature for 6 hours. The obtained reaction product was subjected to centrifugation and purification to prepare a reaction composite in a core-shell form having a size of 5 to 30 nm wherein an indium selenide particle was coated with copper selenide.

Example 11

10 mmol of aqueous indium nitrate solution and 10 mmol of selenious acid were dissolved in butanediol, mixed together, and heated to 150° C. to proceed a reaction. A solution of 10 mmol of copper chloride and 20 mmol of sodium selenate was added to the reacted mixture, followed by adding 25 mmol of $NaBH_4$ solution as a reductant at room temperature. After reacting for 3 hours at room temperature, the reaction product was subjected to centrifugation and purification to prepare a reaction composite in a core-shell form having a size of 50 to 100 nm wherein an indium selenide particle was coated with copper selenide.

Comparative Example 1

As a seed reactant, 2 g of indium selenide particles were mixed with 2 g of copper nitrate and 2 g of selenious acid in 250 ml of diethylene glycol solvent. The reaction solution was heated to 170° C. and reacted for 3 hours to prepare a reaction composite in a core-shell form wherein an indium selenide particle was coated with copper selenide.

Experimental Example 1

Reaction composites prepared in Examples 1 to 10 and Comparative Example 1, respectively, were photographed by TEM and SEM. In this regard, FIGS. 1 to 3 showed TEM and SEM images of compound particles formed according to Examples 5 and 10, respectively.

Figure 2:
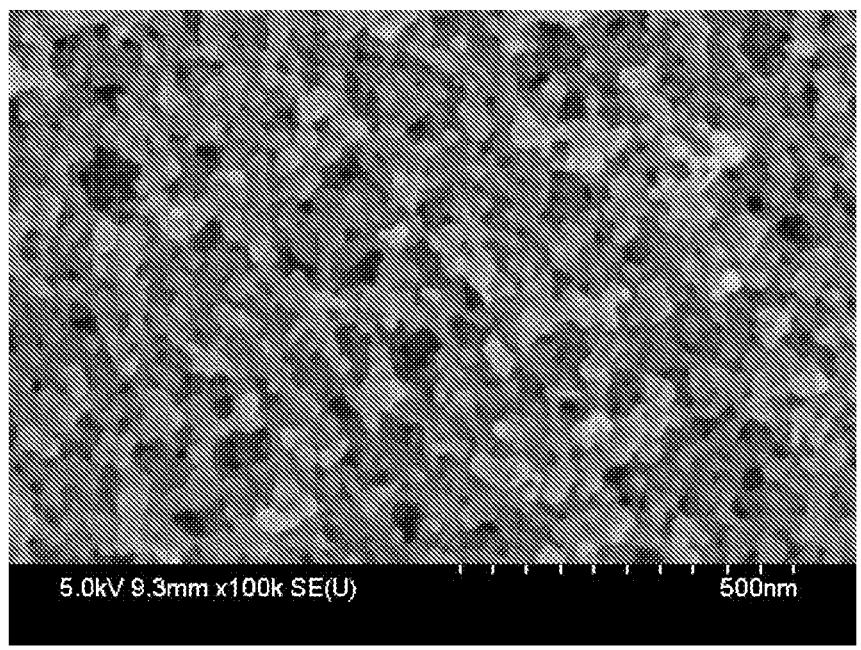
FIG. 2 is a scanning electron microscope (SEM) image illustrating a reaction composite prepared according to Example 5 of the present invention.
Figure 3:
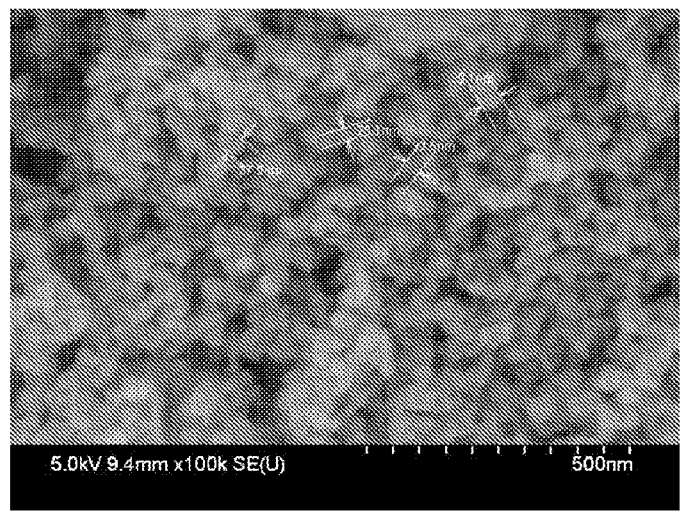
FIG. 3 is an SEM image illustrating a reaction composite prepared according to Example 10 of the present invention.

Referring to FIGS. 1 to 3, it can be seen that the compound particles of Examples 5 and 10 reacted in a desirable solvent containing a reductant, had a particle diameter ranging from 5 to 50 nm and an average size ranging from 25 to 40 nm while exhibiting excellent uniformity in size.

Figure 4:
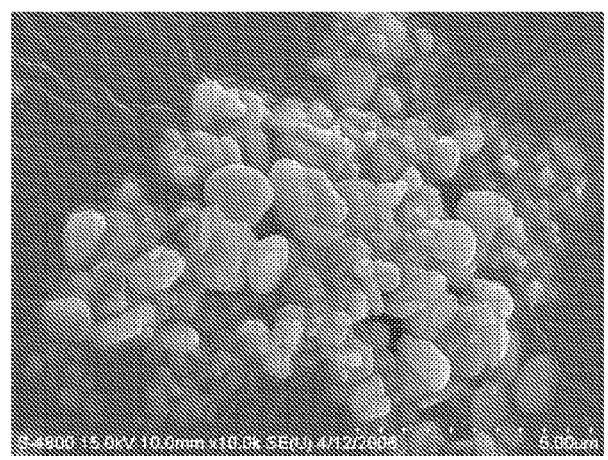
FIGS. 4 and 5 are SEM images illustrating a reaction composite prepared according to Comparative Example 1 of the present invention.
Figure 5:
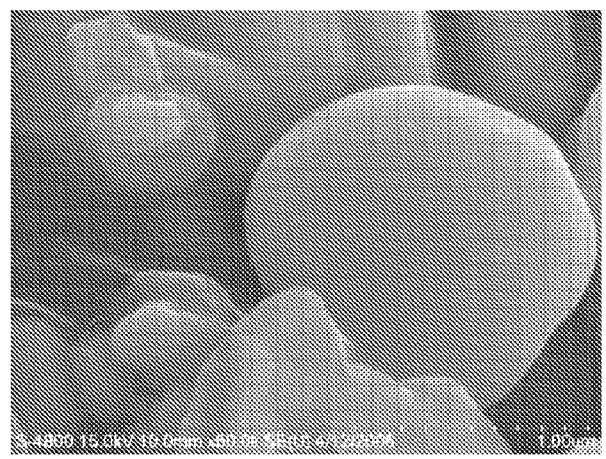

On the other hand, FIGS. 4 and 5 are SEM images illustrating the reaction composite prepared in Comparative Example 1 (FIG. 4: 10,000× magnification, FIG. 5: 50,000× magnification). The SEM images in FIGS. 4 and 5 were obtained using a JSM-6340F electron microscope manufactured by JEOL Co. at an accelerating voltage of 15 keV. As shown in these images, the reaction composite exhibited irregular particle sizes.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, the process for preparation of a compound containing a group 6A element in accordance with the present invention includes a reaction carried out using a reductant in a solvent so as to produce a compound with a uniform particle size and improved dispersion and coating properties, and may easily control reaction conditions and allow the reaction to be carried out at relatively low temperature, thereby considerably reducing production costs. Therefore, when the prepared compound particle is used, a high efficiency absorption layer may be fabricated so that a final solar cell product having such an adsorption layer may have improved efficiency which in turn may strengthen competitiveness of products. In addition, the compound particles prepared according to the present invention may be effectively used in various applications such as solar cells and other electronic devices.

What is claimed is:

1. A process for preparation of a compound containing a group 6A element, comprising: reacting at least one compound selected from the group consisting of the group IB element-containing compounds and group 3A element-containing compounds, with a group 6A element-containing compound, using a reductant in a solvent so as to produce a compound containing group 1B-6A elements, a compound containing group 3A-6A elements, or a compound containing group 1B-3A-6A elements, wherein the reductant is at least one selected from a group consisting of hydrazine ($N_2H_4$), $NaBH_4$, $NaBH(OAc)_3$, $LiAlH_4$, diisobutylaluminum hydride (DIBALH), phenyl hydrazine, ascorbic acid, cysteine, fructose, ribose, galactose, and tocopherol, or a mixture of two or more thereof; and wherein the solvent is at least one selected from the group consisting of water, alcohol, ether, ketone, and amine based solvents.

2. The process according to claim 1, wherein the compound containing a group IB element or a group 3A element is a salt.

3. The process according to claim 1, wherein the compound containing a group IB element is a copper salt compound, the compound containing a group 6 A element is a compound selected from the group consisting of selenic acid ($H_2SeO_4$), sodium selenite ($Na_2SeO_3$), sodium selenate ($Na_2SeO_4$), selenium dioxide and selenious acid ($H_2SeO_3$), and the compound containing group 1B-6A elements is copper selenide.

4. The process according to claim 3, wherein the copper salt compound is selected from the group consisting of copper nitrate, copper sulfate, copper chloride (CuCl or $CuCl_2$), copper bromide (CuBr or $CuBr_2$), copper iodide (CuI or $CuI_2$) and copper hydroxide.

5. The process according to claim 1, wherein the compound containing a group 3A element is an indium salt compound, the compound containing a group 6A element is a compound selected from the group consisting of $H_2SeO_4$, $Na_2SeO_3$, $Na_2SeO_4$, selenium dioxide and $H_2SeO_3$, and the compound containing group 3A-6A elements is indium selenide.

6. The process according to claim 5, wherein the indium salt compound is selected from the group consisting of indium nitrate ($In(NO_3)_3$), indium sulfate ($In_2(SO_4)_3$), indium chloride (InCl, $InCl_2$ or $InCl_3$), indium bromide (InBr, $InBr_2$ or $InBr_3$), indium iodide (InI or $InI_3$) and indium hydroxide ($In(OH)_3$).

7. The process according to claim 1, wherein each of the compound containing group 1B-6A elements, the compound containing group 3A-6A elements and the compound containing group 1B-3A-6A elements is prepared in the form of particles.

8. The process according to claim 7, wherein the particle containing group IB-3A-6A elements is a reaction composite formed using at least one selected from the group consisting of the particle containing group 1B-6A elements and the particle containing group 3A-6A elements as a seed and bringing the remainder except for the seed into contact with one or more parts on a surface of the seed reactant.

9. The process according to claim 8, wherein the reaction composite has a core-shell structure wherein the seed reactant is coated with the remainder.

10. The process according to claim 8, wherein the reaction composite has a dendrite structure wherein the remainder is partially grown on a surface of the seed reactant.

11. The process according to claim 1, wherein an amount of the reductant ranges from 1 to 100 equivalent weights of a group 3 A element or a group IB element.

12. The process according to claim 1, wherein the solvent is at least one selected from a group consisting of water, ethanol, isopropanol, polyethylene glycol, ethylene glycol, diethylene glycol and 1,4-butanediol, at least one or polar solvent selected from the group consisting of NMP, DMF, DMSO and DMAc.

13. The process according to claim 1, wherein the reaction is conducted at room temperature.

* * * * *